HENRY D. DAWBARN
INVENTOR

HENRY D. DAWBARN
INVENTOR

United States Patent Office 3,595,722
Patented July 27, 1971

3,595,722
PROCESS FOR FORMING A THERMOPLASTIC PRODUCT
Henry D. Dawbarn, Waynesboro, Va., assignor to Thiokol Chemical Corporation, Bristol, Pa.
Original application Apr. 17, 1964, Ser. No. 360,673, now Patent No. 3,445,319. Divided and this application Apr. 2, 1969, Ser. No. 841,641
Int. Cl. B32b 5/00
U.S. Cl. 156—177                          7 Claims

ABSTRACT OF THE DISCLOSURE

An integral thermoplastic product is provided from a prearranged array of straight, thermoplastic filaments. The filaments, arranged in the same plane, are conveyed to a compressing zone from two or more directions, and contacted thereat with a molten film of thermoplastic. The contacted filaments are cooled by quenching and an integral product is formed.

---

Figure 1:
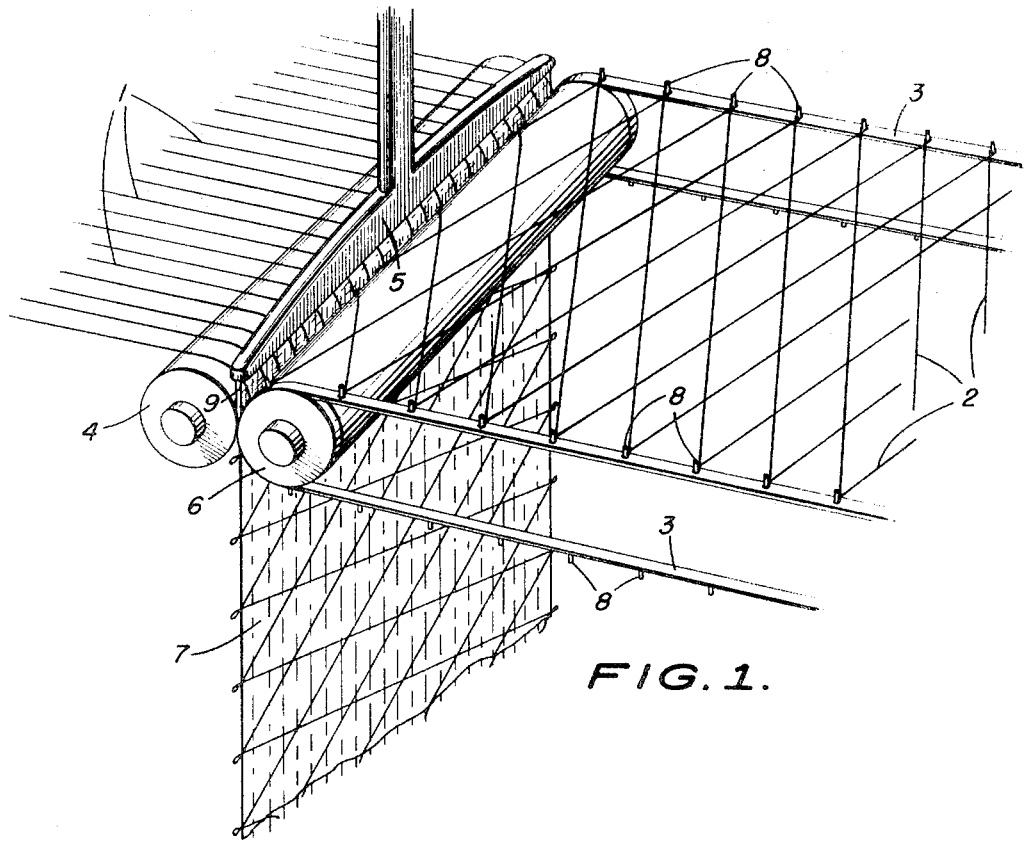

This application is a division of application Ser. No. 360,673, filed Apr. 17, 1964, now U.S. Pat. 3,445,319.

The present invention relates to a novel and useful product, a process for forming the product and a method for utilizing the product. More particularly, it relates to a thermoplastic fence-like or film product which is suitable for a multiplicity of uses.

It is known in the art that various plastic films and the like may be utilized as tarpaulins, film coverings, moisture barriers, canopies, covers for crops, and the like. However, such plastic films tear quite easily after the initiation of the tear. In addition, such film products stretch quite easily and thus are not dimensionally stable. Quite obviously, if an inexpensive product could be produced which would resist such tearing, it would receive widespread acceptance in the art.

It is an object of the present invention to provide a fence-like product or film which is reinforced on at least one side with filaments. A further object is to provide a dimensionally stable film product. Another object is to provide a method for depositing particles from a fluid stream. A still further object is to provide a thermoplastic product which is useable as an inexpensive snow fence or a fence to prevent beach erosion. Another object is to provide a process for inexpensively forming such a thermoplastic product. Other objects will become apparent as the description of the invention proceeds.

These objects are accomplished by the present invention which provides an integral unitary thermoplastic product comprising a substantially unoriented thermoplastic film reinforced in at least two directions with substantially straight, oriented, thermoplastic filaments on at least one side of the film.

The present invention also provides a method for depositing particles from a fluid stream which comprises suspending, in the path of the moving fluid, an integral unitary thermoplastic product comprising a substantially unoriented thermoplastic film reinforced in at least two directions with substantially straight, oriented, thermoplastic filaments on at least one side of the film.

In addition, the present invention provides a process for forming an integral unitary thermoplastic product which comprises prearranging a plurality of substantially straight, oriented, thermoplastic filaments in at least two directions, extruding a molten film of a thermoplastic on one side of said filaments and thereafter quenching the molten thermoplastic film in contact with the filaments to form the final product.

In a preferred embodiment of the present invention the thermoplastic is a polyolefin and the film is reinforced on both sides with oriented thermoplastic filaments. In a still more preferred embodiment, the film is formed into a plurality of strips which are held together by the filaments. Such a product is particularly suitable for depositing particles from a fluid stream.

The filament and film of the present invention can be of any desired thickness. In general, however, the film will be from about 0.5 to about 10 mils in thickness and the filaments will have a denier of from about 50 to about 1500.

The terms "integral" and "unitary" are used to signify that the thermoplastic product is a single entity and it represents a continuous plastic phase from each group of filaments to the film. The expression "thermoplastic" signifies any plastic which becomes molten upon heating. The terminology "reinforced in at least two directions" means that the filaments are laid in such a manner that the filaments immediately become taut if tension is applied in the two directions. For example, if longitudinal filaments are employed on one side of the film and the second set of the filaments are laid 90° to the longitudinal filaments, the filaments become taut upon the exertion of lengthwise or widthwise tension of the film. The phrase "substantially unoriented" is used in the conventional sense to mean that the film has not been stretched so as to align the molecules. The term "oriented" is used in the opposite sense to mean that the filament has been stretched to orient the molecules in the plastic.

Among the various plastics which may be utilized in the practice of the present invention are poly (alpha-olefins) such as polypropylene and polyethylene homopolymers or copolymers; the nylons such as 6-nylon and 6,6-nylon and the polyesters such as polyethylene terephthalate and many others all of which are well known and widely used in the art.

The phase "connected together by" merely signifies that the filaments extend from one film strip to another so that the strips are intimately held together. The term "fluid" means any liquid or gas such as air, water or the like. The expression "extruding" is used in the broadest sense to mean that the molten film strips are placed in contact with one side of the filaments. The molten film may be extruded onto the filaments on a flat surface but is more preferably extruded into the nip of the rollers which feed the filaments as is hereinafter more fully set forth.

The invention is hereinafter more fully described by reference to the drawing.

In the accompanying drawings which illustrate preferred embodiments of the present invention:

FIG. 1 is a pictorial representation of the apparatus used to carry out the process and form the product of the present invention; and FIGS. 2 through 7 are schematic representations of products formed in accordance with the present invention.

In FIG. 1 a plurality of oriented longitudinal filaments are led over a roller 4 in parallel relationship. Oriented diagonal filaments 2, looped about pins 8 on a frame 3, are also led over a roller 6 where both sets of oriented filaments meet at the nip of the rolls. A plastic supply nozzle 5 extrudes a molten polymer 9 to the nip of the two rolls where it is cooled and forms a film which is bonded to both sets of filaments. The final product 7 is withdrawn below the rolls.

Figure 2:
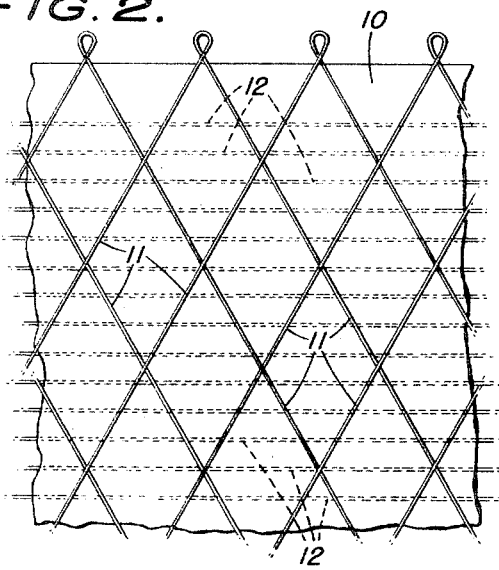
Figure 3:
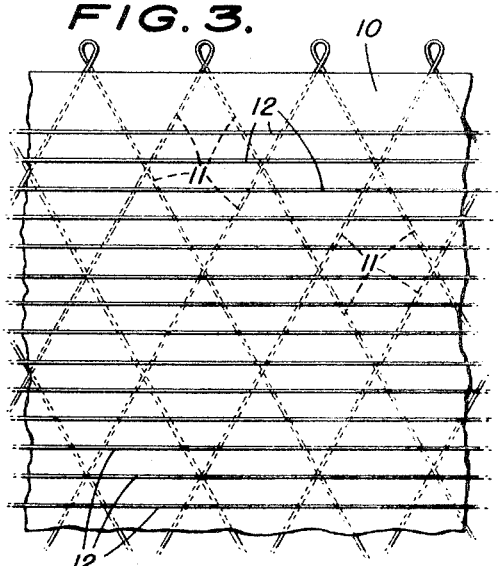
Figure 4:
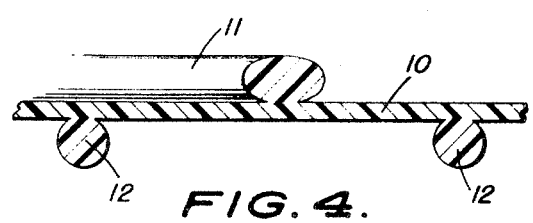
Figure 5:
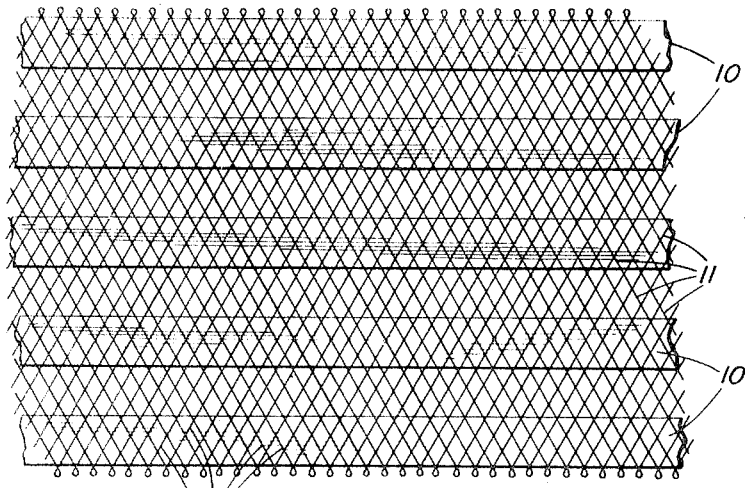
Figure 6:
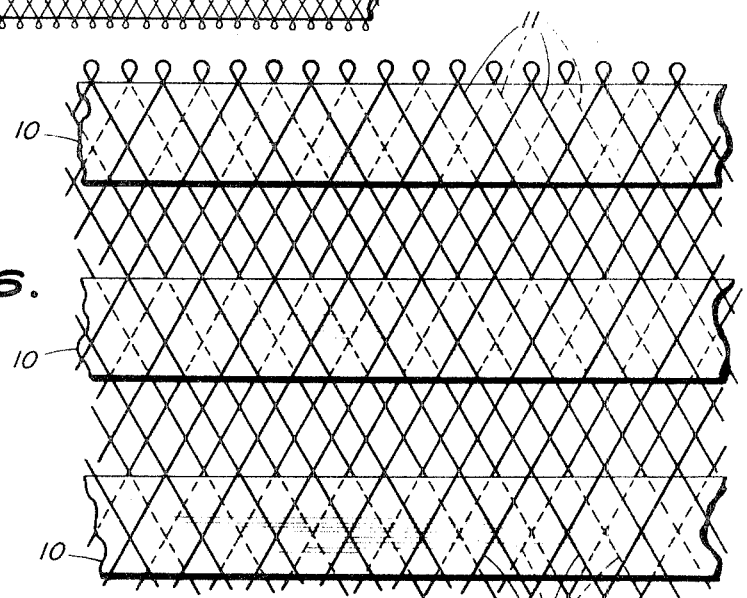
Figure 7:
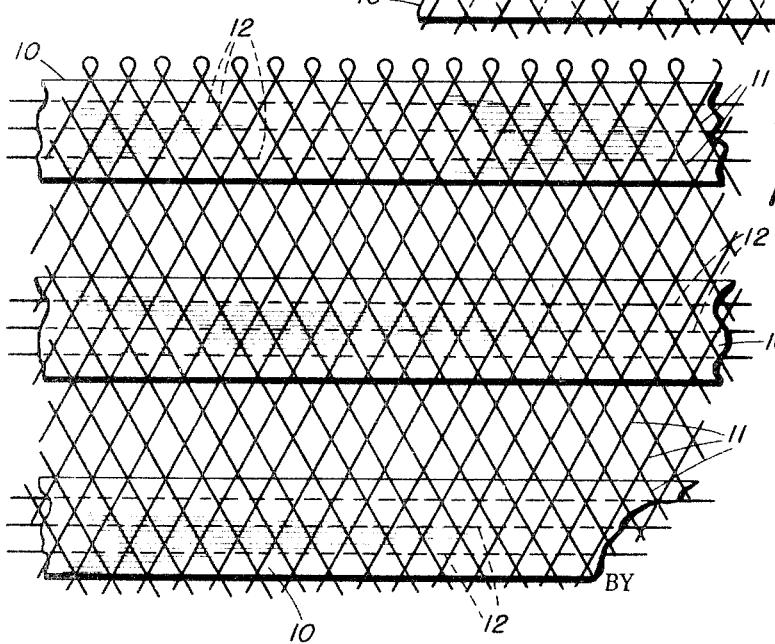

In FIG. 2, the film 10 is shown bonded to the oriented longitudinal filaments 12 and the oriented diagonal filaments 11. FIG. 3 is a back view of the product of FIG. 2 and FIG. 4 shows the intimate bonding of both sets of oriented filaments to the film. In FIG. 5, the film is extruded as a plurality of film strips 10 and only one set of diagonal filaments 11 are employed. In FIG. 6 a set of diagonal filaments 11 are bonded to each side of the film strip 10. In FIG. 7, strips of film 10 and oriented diagonal filaments 11 are utilized as in FIG. 5 but, in addition, oriented longitudinal filaments 12 are utilized along each strip of film 10.

The following examples are given to illustrate the invention and are not intended to limit it in any manner. All parts are given in parts by weight unless otherwise indicated.

EXAMPLE 1

The apparatus shown pictorially in FIG. 1 is employed to form an integral unitary thermoplastic product approximately 21 inches wide. The longitudinal filaments are spaced approximately 1 inch apart. Each filament is 600 denier (12 mils dia.) of a commercial polyethylene copolymer (containing about 1% butene-1) having a density of 0.950 and a melt index of 0.4 which have been oriented by drawing 8×. The same filaments are used in the diagonal diamond pattern and are spaced approximately 1 inch apart at 60° angles to the longitudinal filament is not bonded to the film. The product is quite a density of 0.918 and a melt index of 2.0 is extruded from the nozzle to the nip of the rolls in the form of a thin film at a temperature of 600° F. The rolls are maintained at a temperature of about 65° F. by circulating water.

The final product as shown in FIGS. 1 to 4 has a film about 2 mils in thickness and all fibers are intimately bonded to the film with the exception of a very small area at the intersection of the diagonal filaments wherein one diagonal filament passes over the other and the upper filament is not bonded to the film. The product is quite strong and tears generally terminate at the first filament encountered. It is dimensionally stable in all directions and is suitable for use in tarpaulin, wrapping for cotton bales and the like.

EXAMPLE 2

The procedure of Example 1 is repeated with the exception that the longitudinal filaments are spaced ¼ inch apart rather than 1 inch apart as in Example 1.

The final product is the same as the product of Example 1 with the exception of the closer spacing of the longitudinal filaments.

EXAMPLE 3

The apparatus shown pictorially in FIG. 1 is employed to form an integral unitary thermoplastic product approximately 21 inches wide. The longitudinal filaments are ribbon filaments spaced approximately ¼ inch apart. Each filament is 1125 denier (0.1 inch wide) of a commercial polyethylene homopolymer having a density of 0.960 and a melt index of 0.7 which have been oriented by drawing 5×. The round filaments of Example 1 are used in the diagonal diamond pattern and are spaced approximately 1 inch apart at 60° angles to the longitudinal filaments. Low density polyethylene homopolymer having a density of 0.918 and a melt index of 2.0 is extruded from the nozzle to the nip of the rolls in the form of a thin film at a temperature of 600° F. The rolls are maintained at a temperature of about 65° F.

The final product has a film about 2 mils in thickness and all fibers are intimately bonded to the film with the exception of a very small area at the intersection of the diagonal filaments wherein one diagonal filament passes over the other and the top filament is not bonded to the film.

EXAMPLE 4

The apparatus shown pictorially in FIG. 1 is employed to form an integral unitary thermoplastic product approximately 21 inches wide. The longitudinal filaments are spaced approximately 1 inch apart. Each filament is 565 denier (12 mils dia.) of a commercial polypropylene homopolymer having a density of 0.90 and a melt flow of 3.0 which have been oriented by drawing 7×. The same filaments are used in the diagonal diamond pattern and are spaced approximately 1 inch apart at 60° angles to the longitudinal filaments. The same polypropylene homopolymer is extruded from the nozzle to the nip of the rolls in the form of a thin film at a temperature of 500° F. The rolls are maintained at a temperature of about 65° F.

The final product has a film about 3 mils in thickness and all fibers are intimately bonded to the film with the exception of the very small area at the intersection of the diagonal filaments wherein one diagonal filament passes over the other and the filament is not bonded to the film.

EXAMPLE 5

The apparatus shown pictorially in FIG. 1 is employed to form integral thermoplastic product approximately 21 inches wide. To place the diagonal filaments on both sides of the film, the apparatus of FIG. 1 is modified by using a frame containing pins on both sides of the extrusion nozzle. The filaments on each side are 600 denier (12 mils dia.) of a commercial polyethylene copolymer (containing about 1% butene-1) having a density of 0.950 and a melt index of 0.4 which have been oriented by drawing 8×. The same filaments are used in both diagonal diamond patterns and are spaced approximately 1 inch apart at 60° angles. Low density polyethylene homopolymer having a density of 0.918 is extruded at 600° F. from the nozzle to the nip of the roll in the form of 6 thin films 2 inches wide which are spaced about 1¾ inches from each other. The rolls are maintained at a temperature of about 65° F. by circulating water.

The final product as shown in FIG. 6 has a film about 2 mils in thickness and all fibers are intimately bonded to the film with the exception of a very small area at the intersection of the diagonal filaments wherein one diagonal filament passes over the other and the filament is not bonded to the film. The product is quite strong.

The resulting product is suspended between two fence posts in the same manner as a snow fence and the action is very similar to that of a snow fence. The spacing between the film sections allows much of the wind to pass through while causing drifting of the snow behind the fence. Tre same product is suspended partially submerged in a running stream. It similarly causes deposition of sand particles from the stream without material interference with the stream flow. The same product can be used to prevent beach erosion.

EXAMPLE 6

The procedure of Example 5 is repeated with the exception that only a single set of diagonal filaments is utilized on only one side of the film strips. Also, the filaments are placed ¼ inch rather than 1 inch apart as in Example 5.

The final product is similar to that of Example 5 but contains filaments on only one side of the film strips. A similar type product is shown in FIG. 5.

EXAMPLE 7

The procedure of Example 5 is repeated with the exception that 3 longitudinal filaments are equidistantly spaced across each of the film strips. The side containing the longitudinal filaments does not contain diagonal filaments.

The final product contains diagonal filaments on one side of the film strips and longitudinal filaments on the other side of each strip. The final product is shown in FIG. 7.

EXAMPLE 8

The procedure of Example 5 is repeated with the exception that the polypropylene homopolymer filaments and film of Example 5 are employed in the process also, an extrusion temperature of 500° F. is employed rather than 600° F.

The resulting product is substantially identical to the product of Example 5 and causes deposition of the product in the same manner.

While in the above examples the longitudinal and diagonal filaments are placed on opposite sides of the film or film strips, it is obvious that both could be placed on the same side so as to permit bonding of the structure to a backing material. Also, while the diagonal strips are generally placed at an acute angle, it is obvious that they could be placed at 90° to the longituidinal filaments. Other materials such as dyes, pigments and the like may be introduced into the molten structure without substantial alteration of the final shape structure.

Many other equivalent modifications will be apparent to those skilled in the art from a reading of the foregoing without a departure from the inventive concept.

What is claimed is:

1. A process for forming an integral thermoplastic product which comprises the steps of;
   prearranging in an array a plurality of substantially straight, oriented thermoplastic filaments, said filaments being substantially in the same plane and arranged therein in at least two directions;
   conveying said filament array to a compressing zone;
   extending a molten film of a thermoplastic in said zone, said film being substantially coextensive with said filament array;
   contacting said molten film with said filaments on at least one side thereof, and thereafter quenching said contacted film to form said thermoplastic product.
2. The process of claim 1 further including the additional steps of conveying at least one additional filament array of a plurality of substantially straight oriented thermoplastic filaments to said compressing zone and extruding said molten film between first mentioned filament array and said additional filament array.
3. The process of claim 1 wherein the molten film is a polyolefin.
4. The process of claim 3 wherein the polyolefin is selected from the group consisting of polypropylene and polyethylene.
5. The process of claim 1 wherein the filaments are polyolefinic polymers.
6. The process of claim 5 wherein the polyolefinic polymer is selected from the group consisting of polypropylene and polyethylene.
7. The process of claim 1 wherein the film is extruded in the form of at least two separated parallel strips and the filaments contact each of said strips to form the integral, final product.

References Cited

UNITED STATES PATENTS

| | | | |
|---|---|---|---|
| 3,300,366 | 1/1967 | Krolik | 156—244X |
| 3,392,076 | 7/1968 | Van der Pals | 156—244 |
| 3,445,319 | 5/1969 | Dawbarn | 156—244X |
| 3,449,187 | 6/1969 | Bobkowicz | 156—244X |

CARL D. QUARFORTH, Primary Examiner

S. J. LECHERT, Jr., Assistant Examiner

U.S. Cl. X.R.

156—178, 179, 244, 299, 306, 309, 300, 301